United States Patent [19]

Chandler

[11] 4,431,333

[45] Feb. 14, 1984

[54] APPARATUS FOR RELEASABLY CONNECTING FIRST AND SECOND OBJECTS IN PREDETERMINED SPACE RELATIONSHIP

[75] Inventor: Joseph A. Chandler, Dickinson, Tex.

[73] Assignee: The United States of America as represented by the Administrator of the National Aeronautics and Space Administration, Washington, D.C.

[21] Appl. No.: 368,189

[22] Filed: Apr. 14, 1982

[51] Int. Cl.³ .................... B25G 3/18; F16B 21/00; F16D 1/00
[52] U.S. Cl. .................................... 403/322; 244/161
[58] Field of Search ............... 403/321, 322, 326, 327, 403/330, 263, 350, 329; 285/309, 310, DIG. 21; 244/161, 135 A

[56] References Cited

U.S. PATENT DOCUMENTS

| | | | |
|---|---|---|---|
| 3,445,133 | 5/1969 | Reischl | 403/321 X |
| 3,475,001 | 10/1969 | Hieber | 244/135 A |
| 4,119,051 | 10/1978 | Orndorff | 244/161 |
| 4,177,964 | 12/1979 | Hujsak | 244/161 |
| 4,305,386 | 4/1980 | Tawara | 403/322 |
| 4,355,917 | 10/1982 | Burg | 403/322 |

Primary Examiner—Wayne L. Shedd
Attorney, Agent, or Firm—Carl O. McClenny; John R. Manning; Marvin F. Matthews

[57] ABSTRACT

Apparatus is disclosed for releasably connecting first and second space objects, such as a spacecraft and a space vehicle, in predetermined spaced relationship. The apparatus comprises at least one probe member (10) mounted on the first object (1), having an elongated shank portion (11), the distal end of which is provided with a tapered nose portion (12). At least one drogue assembly (20) is mounted on the second space object (2) for releasably capturing the probe member 10 upon the first and second objects (1 and 2) being brought into close proximity with each other.

The drogue assembly (20) may comprise a housing (21, 28) which carries a cone subassembly (40, 41) having inwardly tapered conical surfaces (42, 43) for receiving the probe member (10). The housing (21, 28) carries a plurality of latch members (70) radially movable between retracted positions in which the latch members (70) do not project inwardly of the tapered conical surfaces (42, 43), and extended positions, in which the latch members (70) project inwardly of the tapered conical surfaces (42, 43) for engagement with the probe member (10). An operator assembly including an actuator arm (90) is carried by the housing (21, 28) and operable, when the probe (10) has been fully received, to lock the latch members (70) in the extended positions engaging the probe members (10) and releasably connecting the probe members (10) and the drogue assembly (20) in a substantially fixed axial relationship.

20 Claims, 8 Drawing Figures

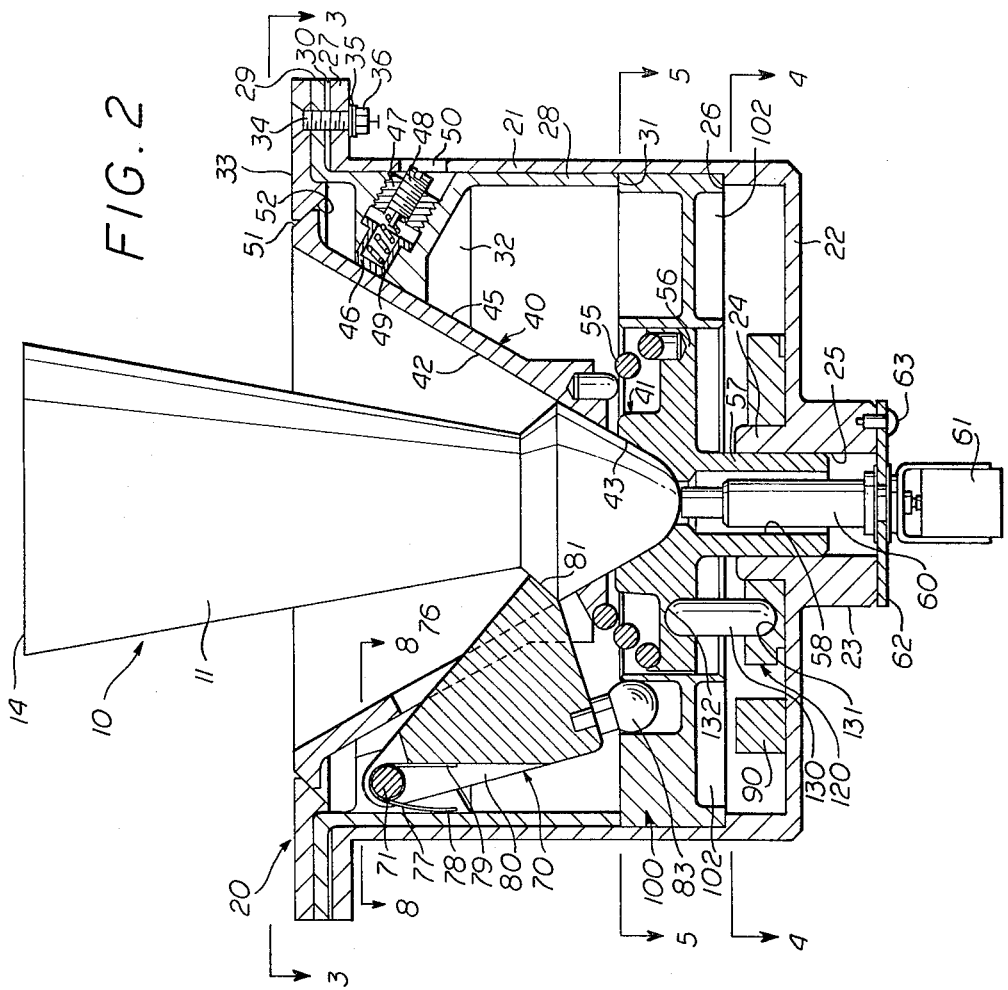

APPARATUS FOR RELEASABLY CONNECTING FIRST AND SECOND OBJECTS IN PREDETERMINED SPACE RELATIONSHIP

ORIGIN OF INVENTION

The invention described herein was made by an employee of the U.S. Government and may be manufactured and used by or for the Government of the United States of America for governmental purposes without the payment of any royalties thereon or therefor.

TECHNICAL FIELD

The present invention pertains to apparatus for releasably connecting first and second objects in predetermined space relationship. Specifically, the present invention pertains to docking apparatus suitable for allowing remote control of undocking and redocking of a space experiment vehicle to a supporting spacecraft.

BACKGROUND ART

A number of patents disclose apparatus for docking of spacecraft or connecting aircraft in flight. For example, U.S. Pat. No. 3,737,117 discloses a spacecraft docking structure in which space vehicles are joined at a conical receptacle in conical projection. One unique feature of this patent is the provision of a pressurized gas compartment for absorbing docking energy.

U.S. Pat. No. 3,443,773 discloses a docking structure for spacecraft in which docking elements of the spacecraft are mated with circular openings of a space vehicle. Docking energy is absorbed by crushable materials strategically placed on the space vehicle. Spring biased latches are also utilized in absorbing some of the docking energy.

U.S. Pat. No. 3,475,001 discloses an aerial refueling probe and drogue structure for passing fuel between aircraft. The probe is provided with circumferential groove or channel which is locked into operational position by a hydraulic actuator pushing a roller into the groove or channel.

U.S. Pat. No. 3,737,181 discloses apparatus for releasing a pair of coaxially related tension menbers. The apparatus is fixed to one of the tension members and may be attached to a second tension member by way of a disconnect shaft. A protuberance on the disconnect shaft is held to the apparatus by means of collet lugs or fingers held in place by a circular piston. Movement of the circular piston in response to expanding gases in a chamber allows movement of the collet lugs to release the protuberance.

U.S. Pat. No. 3,174,706 discloses a separation device for retention of a satellite but for release thereof in response to a signal. A circular cam is rotated by disengage clamps which hold the satellite to a space vehicle. Such apparatus is strictly for separation and not suitable for redocking.

U.S. Pat. No. 4,065,217 discloses a mechanism for releasably locking a nose tip to a vehicle utilizing a pawl and ratchet and pinion arrangement. The primary purpose of such mechanism is to allow attachment and detachment of radioactive nosetips from vehicles with minimal exposure to personnel. Such attachment or detachment is not done in flight.

Finally, while it is not related to space vehicles, U.S. Pat. No. 2,645,506 discloses connection apparatus which could be used in space. Specifically, it discloses a pipe flange connector in which a circular cam plate is used to move dogs or latches into or out of locking arrangement. However, no mechanism is disclosed suitable for guiding and capturing an object in space.

DISCLOSURE OF INVENTION

In accordance with the present invention, apparatus is disclosed for releasably connecting first and second space objects in predetermined space relationship. The apparatus comprises at least one probe member mounted on the first space object, having an elongated shank portion, the distal end of which is provided with a tapered nose portion which terminates in an enlarged diameter with a reverse conical shoulder receding into the aforementioned elongated shank. The reverse conical shoulder provides a surface for retention of the probe into a drogue assembly. At least one drogue assembly is mounted on the second space object for releasably capturing the probe member upon the first and second space objects being brought into close proximity with each other.

The drogue assembly may comprise a housing which carries a cone device having inwardly tapered conical surfaces for receiving the probe member. Latch means are carried by the housing and include a plurality of latch members radially movable between retracted positions, in which the latch members do not project inwardly of the tapered conical surfaces, and extended positions, in which the latch members project inwardly of the tapered conical surfaces for engagement with the probe member. Operator means are carried by the housing and operable, when the probe has been fully received by the cone means, to lock the latch members in the extended positions engaging the probe member and releasably connecting the probe member and the drogue assembly in a substantially fixed axial relationship.

There are several unique features of the apparatus of the present invention. The cone means is mounted for limited floating to allow limited misalignment of the first and second space objects as they are brought into close proximity. Spring mechanisms absorb both radial and axial docking loads. The operator means includes uniquely designed cam members for operation of the latch means and cooperating link members by which the probe member is rigidly confined in the cone means in a substantially fixed axial relationship. Many other objects and advantages of the invention will be apparent from reading the description which follows in conjunction with the accompanying drawings.

BRIEF DESCRIPTION OF THE DRAWINGS

Details of the invention will be described in connection with the accompanying drawings in which:

FIG. 1 is a schematic representation of first and second space objects illustrating general relationship of apparatus carried thereby for releasable connection of the first and second space objects in predetermined space relationship according to a preferred embodiment of the invention;

FIG. 2 is a longitudinal cross-sectional view of releasable connection apparatus of the present invention illustrating a probe member being received by a drogue assembly, the drogue assembly of which is shown in cross-section;

BEST MODE FOR CARRYING OUT THE INVENTION

Figures 3, 4:
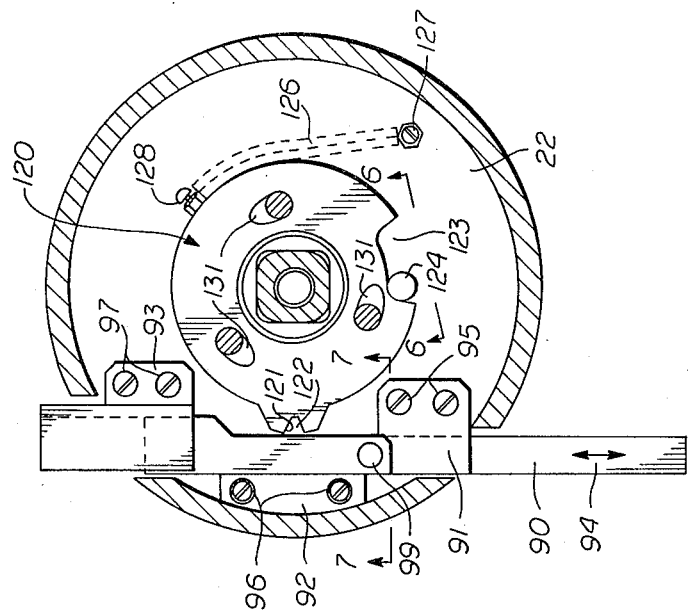
FIG. 3 is a view looking into the drogue assembly of FIG. 2, along line 3—3, with the probe removed therefrom.
FIG. 4 is a cross-sectional view of the drogue assembly of FIG. 2, taken along line 4—4 thereof.

Referring first to FIG. 1, there is shown a portion of a first space object 1 and a second space object 2 detached therefrom. The first space object 1 represents a portion of a spacecraft such as the one referred to as the "Orbiter" utilized in space transportation system missions. The second space object 2 may be a remotely radio-controlled space satellite vehicle to be launched aboard and flown from the Orbiter spacecraft 1. The satellite vehicle 2 could be used for numerous tasks such as orbiter inspection, experiment transfer, joint experiments, satellite surveillance and/or recovery of satellites or experiments. For these purposes, the space object or vehicle 2 could be equipped with television cameras 3, lights 4, radar 5, and other components such as batteries, sun sensors, antennas, manipulators, experiment programmers, various electronics, etc. (not shown). While the satellite vehicle 2 is carried into space by the Orbiter 1, it may be equipped with its own propulsion system including propulsion tanks (not shown) and associated thrusters 6 by which the vehicle 2 can be positioned in space relative to the spacecraft 1.

The satellite vehicle 2 would normally be launched mounted in the cargo bay of the Orbiter (spacecraft 1) mounted on a flight support station 7 by a docking system which is the primary subject of the present application. The docking system allows remote control of undocking and redocking of the vehicle 2 to the Orbiter flight support station 7 through the use of television as means to guide the vehicle 2 to the docking interface. The flight support station 7 includes a docking target 8 which is aligned with a crosshair 9 on a television screen emanating from the TV camera 3 carried by the space vehicle 2. Remote control of the vehicle 2 may be performed from a command station on board the Orbiter (spacecraft 1). Lateral, radial and axial alignment can be perceived by experienced operators using this technique.

The docking system illustrated in FIG. 1 is a three-point system which sustains all structural loads for Orbiter launch and landing. Each point comprises a probe member 1, fixed at the support station 7 of the spacecraft 1, and corresponding drogue assemblies 20 mounted on the second space object or vehicle 2. The probes 10 remain fixed at the flight support station 7 and are passive. The drogue assemblies 20 are the active mechanisms by which the spacecraft 1 and space vehicle 2 are docked and undocked. During the docking maneuver, exact alignment cannot be maintained; therefore, misalignment capability is designed into the docking system. Thus, the following criterion was utilized in designing the docking system of the present invention:

(1) axial velocity of 0.1 to 0.5 ft./sec.;
(2) radial velocity of 0 to 0.2 ft./sec.;
(3) angular velocity of 0 to 1.0 deg./sec.;
(4) angular misalignment ±5° pitch and yaw, ±2° roll;
(5) radial misalignment ±2 inches.

The following additional requirements were established:

(1) active portion of the docking system should be on the vehicle 2;
(2) automatic capture, three-position latch;
 (a) locked (latch secure for launch/reentry load);
 (b) capture (latches loose for capture with minimal force, each latch independent);
 (c) release (latches fully released without imparting loads to the vehicle 2).
(3) docking target must be eighteen inches from the vehicle camera lens in the docked position (this requirement dictated by camera focal length).

Referring now to FIG. 2, the structure and relationship of a probe member 10 and drogue assembly 20 will be explained. The probe member 10 has an elongated shank portion 11 at the distal end of which is provided a tapered nose portion 12. The shank 11 and tapered nose 12 are connected by an annular conical shoulder 13 facing toward the proximal end 14 of the shank portion 11 which is attached to the support station 7 of the spacecraft 1 (see FIG. 1).

The drogue assembly 20 includes a number of subassemblies: housing means, cone means, latch means and operator means. The housing means includes a cylindrical outer housing 21 substantially closed at one end thereof by a circular bottom wall 22. Centrally disposed in the bottom wall 22 is a hub made up of an outer hub portion 23 and a smaller diameter inner hub portion 24 through both of which an aperture 25 of substantially square cross-section is provided. It will be noted that the wall thickness of the cylindrical outer housing 21 is increased near the bottom wall 22 to provide an upwardly facing annular surface 26. At the upper end of the housing 21 is provided a circular flange 27.

Coaxially received within the outer housing 21 is an inner cylindrical housing 28, the upper end of which is provided with a circular flange portion 29, corresponding with the flange portion 27 of the outer housing 21. A circular shim 30 may be provided at the interface between the flanges 27 and 28 of the outer and inner housing members 21 and 28, respectively. This provides a means of adjusting the docking system assembly preload in the locked position by positioning the inner cylindrical housing 28 along with the latch pins 71 and latches 70 as required to lock the probe nose 12 against the inner surface 43 which will be more fully understood hereafter. It will be noted that the inner housing 21 is provided with an inwardly projecting shoulder or ring 32, the purpose of which is to support other elements of the drogue assembly as will be more fully understood hereafter. Surmounted on the flanges 27 and 28 is a ring-like cover 33. Corresponding holes are provided in the flanges 27, 29, shim 30 and ring cover 33 for receiving screws 34 and cooperating washers and nuts 35 and 36, which hold the housing subassembly together.

Carried by the housing subassembly is a cone subassembly, the primary purpose of which is to guide and receive the probe member 10. The cone subassembly comprises an inverted frusto-conical portion 40 and an inverted apex portion 41 slightly spaced therefrom. The inner surface 42 of the frusto-conical portion 40 is inwardly tapered and the inner surface 43 of the apex portion 41 is also inwardly tapered so that the inner surfaces 42 and 43 cooperate in providing inwardly tapered conical surfaces for receiving the distal end of the probe member 10 upon the first and second space objects being brought together. The tapered surface 43 of the apex portion 41 may be rounded at the apex to correspond with the shape of the probe member nose 12.

The inverted frusto-conical portion 40 of the cone subassembly has a correspondingly tapered outer surface 45 which rests against and is partially supported by a plurality of plungers 46 projecting at regular radial intervals through holes provided therefor in the inner housing shoulder 32. These holes are counterbored to receive an insert 47 through which an adjusting screw passes for engagement with a coiled spring mounted between the plunger 46 and the insert 47. Holes 50 are provided in the outer housing 21 for access to the end of the adjusting screw 48. Thus, the amount of force exerted by the coil spring 49 against the plunger 46 can be adjusted. The inverted frusto-conical cone portion 40 thus rests on the plungers 46 and if a downward force is applied thereto, may move axially or radially by limited amounts. Upper movement is limited by engagement of a tapered shoulder 51 provided on the frusto-conical portion 40 with a tapered shoulder 52 provided on the ring cover 33. In addition, the lower end of the inverted frusto-conical portion 40 of the cone subassembly rests on a spirally wound spring 55 which is in turn supported on a flange portion 56 of the inverted apex portion 41 of the cone subassembly. Thus, the frusto-conical portion 40 floats within the housing subassembly for limited axial, radial and even angular movement relative to the central axis of the housing.

The inverted apex portion 41 is provided with a downwardly depending substantially square hub portion 57 which is centrally received for limited axial movement within the aperture 25 of the outer housing hub 23. Since the hub portion 57 and aperture 25 are square, rotation of the apex portion 41 is prevented. A central aperture 58 passes through the hub portion 57 and through the remainder of the inverted apex portion 41 for receiving an actuator 60 attached to a limit switch 61, the purpose of which will be more fully understood hereafter. In fact, the end of the actuator 60 actually engages the nose portion 12 of the probe member 10 when the probe member 10 is fully received by the drogue assembly 20. The actuator 60 and limit switch 61 are supported on the hub of the outer housing member 21 by a bracket member 62 attached to the hub by screws 63.

Figure 8:
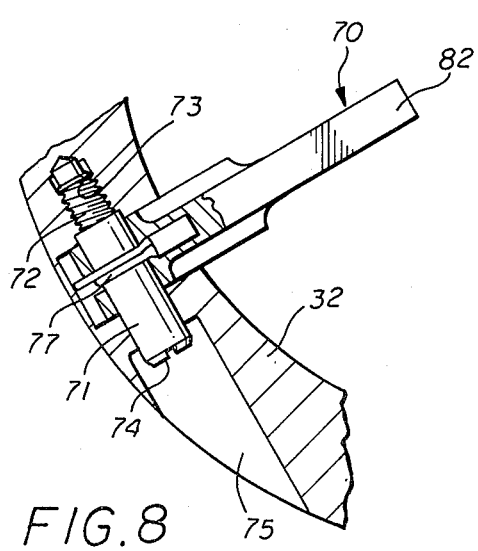
FIG. 8 is a detailed sectional view of the mounting of latch members and the drogue assembly of FIG. 2 taken along line 8—8 thereof.

Also mounted in the housing of the drogue assembly 20 is a latch subassembly comprising a plurality (three in the present case) of latch members 70 pivotally attached, as best seen in FIGS. 2 and 8, to the mounting shoulder 32 of the inner housing 28 by pins 71 one end of which is threaded at 72 for threaded engagement with threaded holes 73 tangentially disposed about the shoulder 32 at regularly spaced intervals. The ends of the pins are slotted 74 for engagement with a screwdriver through counterbored tangential holes 75 provided in the shoulder 32. The latch members 70 are substantially triangular in shape and are capable of radial movement, about the axis of pin 71, relative to the axis of the drogue assembly between retracted positions, in which the latch members 70 do not project inwardly of the tapered conical surfaces 42 and extended positions (as shown in FIG. 2) in which at least a portion of the latch members 70 project inwardly of the tapered conical surfaces 42 through slots 76 provided in the inverted frusto-conical member 40. (See also FIG. 3) A torsion spring 77 wound around the pivot pin 71, one end 78 which bears against the inner housing 28 and the other end 79 which bears against the latch member 70 in a slot 80 provided therefor, biases the latch member 70 toward the extended position shown in FIG. 2. The base of the latch members 70 are provided with a tapered surface 81 which, in the extended position shown in FIG. 2, is capable of engaging the tapered annular shoulder 13 of the probe member 10. The triangular shape of the latch member 70 also provides a slanted edge 82, the purpose of which will be more fully understood hereafter. Attached to the base of the triangularly shaped latch member 70 is a ball-like cam member 83 the purpose of which is to aid in moving the latch members 70 between retracted and extended radial positions, as will be more fully understood hereafter.

Carried in the lower part of the housing 21 is a linear actuator arm 90 one end of which engages a linear motor (not shown) carried by the space object or vehicle 2 in which the drogue assembly 20 is mounted. The actuator arm 90, as best seen in FIG. 4, is confined by guide brackets 91, 92 and 93 for linear motion, as indicated by the arrow 94, in a path perpendicular to a radial line extending from the axis of the drogue assembly 20. Screws or bolts 95, 96 and 97 engaging corresponding holes in the lower wall 22 of the housing member 21 hold the guides 91, 92 and 93 in place. The actuator arm 90 makes up a portion of the operating subassembly of the drogue assembly 20.

Figure 5:
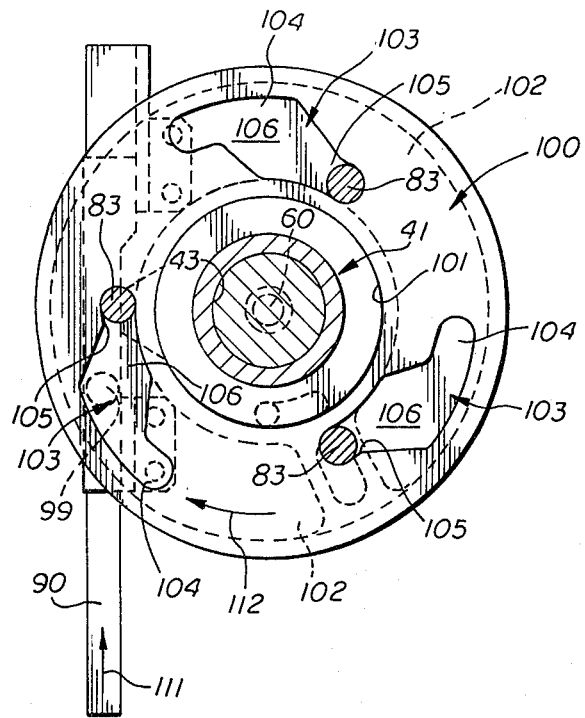
FIG. 5 is a cross-sectional view of drogue assembly of FIG. 2 taken along line 5—5 thereof.

The operating subassembly also includes a circular cam member 100 best seen in FIGS. 1 and 5. The cam member 100 is circular in shape and the outer peripheries thereof are axially retained between the annular shoulders 26 and 31 of the housing subassembly. However, enough clearance is allowed between the cam member 100 and the shoulders 26 and 31 to allow the cam member 100 to rotate about a central axis which corresponds with the central axis of the drogue assembly 20. The cam member 100 includes a central aperture 101 in which the inverted apex member 41 of the cone subassembly is disposed. The cam member 100 may be provided with relieved pockets 102 to lighten the weight thereof. At radially spaced intervals around the upper surface of the cam member 100 are cam slots 103 each of which comprises an outer circumferential portion 104 and an inner circumferential portion 105 connected by a wider intermediate transition portion 106. The ball cam followers 83 attached to the latch members 70 are disposed somewhere within the cam slots 103.

Figure 7:
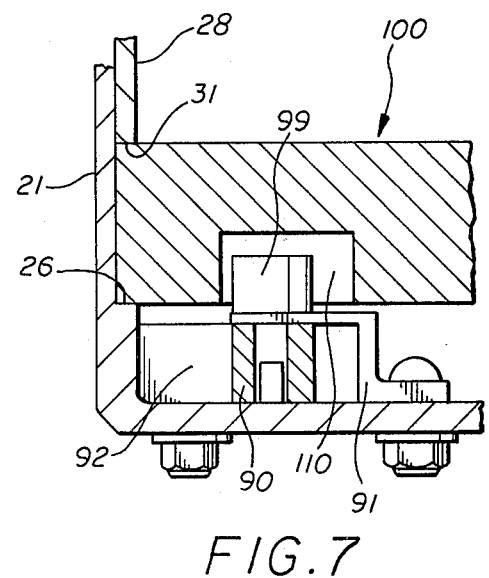
FIG. 7 is a detailed cross-sectional view of a cam and cam follower portion of the drogue assembly of FIG. 4 taken along line 7—7 thereof.

As previously mentioned, the cam member 100 is rotatable. To transmit linear movement of the actuator arm 90 to rotational movement of the cam member 100, the actuator arm 90 is provided with a cam follower 99 which, as shown in FIG. 7, engages a recess 110 on the lower side of the cam member 100. Thus, upon linear movement of the actuator arm 90, the cam follower 99 engaging the recess 110 of the cam follower, causes the cam member 100 to rotate in response to linear movement of the actuator arm 90. For example, with the actuator arm 90 and the cam member 100 in the position shown in FIG. 5, the cam followers 83 attached to the base of the latch members 70 will be engaging the inner circumferential portions 105 of the cam slots 103. Upon movement of the actuator arm 90 in the direction of the arrow 111, the cam member 100 will be rotated clockwise, as indicated by the arrow 112 in FIG. 5, causing the latch member cam follower 83 to follow the cam slot first to the transition area 106 and finally to the outer circumferential area 104. When the cam follower 83 is in the inner circumferential portion 105 of the cam slot 103, the latch member 70 will be in the extended position of FIG. 2. When the cam followers 83 are in the transition area 106 of the slots 103, the latch members 70 will normally be in the extended position of FIG. 2, due to the biasing of spring 77. However, if sufficient force is directed against the edge surface 82 of the latch member 70, the biasing of spring 77 can be overcome forcing the latch member 70 to the retracted position. When the cam followers 83 are in the outer circumferential portions 104 of the cam slots 103, the latch members 70 are forced and maintained in the retracted position.

Figure 6:
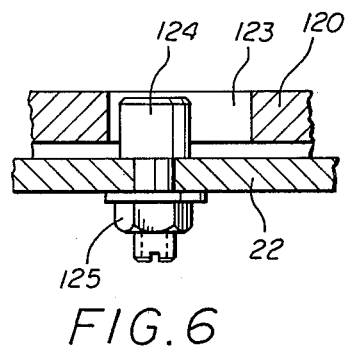
FIG. 6 is a detailed view of a stop mechanism of the connection apparatus of the present invention taken along line 6—6 of FIG. 4.

In addition to the actuator arm 90 and the cam member 100, the operator subassembly comprises a pinion member 120 best seen in FIGS. 2 and 4 which is mounted for rotation about the inner hub portion 24 of the outer housing 21. Thus, the pinion member 120 rotates about a common axis with the central axis of the drogue assembly. The pinion member 120 is provided with a gear slot 121 which is engaged by a gear tooth 122 attached to the actuator arm 90. Thus, it is clear that upon linear movement of the actuator arm 90, the pinion member 120 will be rotated by virtue of the engagement of the tooth 122 with the tooth slot 121. As best seen in FIG. 6, the periphery of the pinion member 120 is also provided with a recess 123 in which is disposed a stop member 124 attached to the housing end wall 22 by a nut 125. The stop is eccentric to the threaded end to provide adjustment of the stopped position of the pinion. The engagement of the stop member 124 with the ends of the recess 123 limit rotation of the pinion member 120. A spring 126, one end of which is attached at 127 to housing wall 22 and the opposite end of which is attached at 128 to the periphery of the pinion member 120, biases the pinion member 120 in a clockwise direction, as viewed in FIG. 4.

Interspersed between the pinion member 120 and the flange portion 56 of the inverted apex member 41 is a plurality of cylindrical link members 130 the ends of which are spherically rounded. The pinion member 120 and inverted apex member 41 are provided with corresponding recessed holes 131 and 132 at radially disposed intervals thereabout. One end of each link member 130 is disposed in corresponding recessed holes 131 of the pinion member and the other end of each link member 130 is disposed in corresponding recessed holes 132 of the inverted apex member 41. The recessed holes 131 of the pinion member and 132 of the inverted apex member 41 are angularly displaced relative to each other so that the link members 130 are inclined relative to the central axis of the drogue assembly. Thus, since the pinion member 120 is essentially fixed in the axial direction and since the apex member 41 is prevented from rotating, rotation of the pinion member 120 will bring recesses 131 and 132 toward angular alignment causing the pin members 130 to be less inclined and forcing the inverted apex portion 41 toward the inverted frusto-conical portion 40. As will be more fully understood hereafter, this will aid in connecting the probe member 10 and drogue assembly 20 in a substantially fixed axial relationship.

Referring now to all the drawings, operation of the connecting apparatus of the present invention will be summarized. With the spacecraft 1 and the vehicle 2 in the undocked positions of FIG. 1, the vehicle 2 is guided toward spacecraft 1 and remotely positioned until the drogue assembly 20 is substantially aligned with the probe members 10. The centerpoints of the target 8 and crosshair 9 are aligned by the television camera 3 and the vehicle 2 brought toward the spacecraft 1 in close proximity with each other. This is done with the latch member 70 in the capture mode. In the capture mode, the cam followers 83 of the latch members 70 are disposed in the intermediate transition area 106 of the cam member 100 cam slots 103. Thus, the latch members 70 are in the extended position but are susceptible to being independently forced to the retracted position with minimal force.

Upon initial contact between the probe member 10 and the drogue assemblies 20, the nose portion 12 of the probe member 10 will normally engage a tapered surface 42 of the inverted frusto-conical member 40. The initial shock of such engagement is cushioned by the spring-loaded plungers 46 and the spirally wound spring 55 which allows the frusto-conical portion 40 to "float". Upon further engagement, the probe member 10 contacts the slanted edge surfaces 82 of the latch members 70 forcing the latch members 70 to retracted positions until the nose 12 passes the latch members 70, allowing the latch members 70 to spring back, under the influence of biasing springs 77, to the extended positions shown in FIG. 2. In such position, the tapered surface 81 of latch members 70 engage the tapered shoulder 13 of probe 10 and the probe member 10 is essentially cpatured by the drogue assembly 20 but not yet ridigly fixed thereto.

As soon as the nose portion 12 of the probe member 10 engages the inverted apex portion 41 it also engages the switch actuator 60 causing the switch 61 to be energized and activating the linear motor (not shown) attached to the actuator arm 90. Either automatically or upon a signal given thereto, the linear actuator then causes the actuator arm 90 to move outward rotating the cam member 100 counterclockwise until the ball followers 83 of the latch members 70 engage the inner circumferential portions 105 of the cam slots 103. This then essentially locks the latch members 70 in the extended positions of FIG. 2.

Simultaneously with the rotation of cam member 100, the pinion member 120 is rotated by the actuator arm 90. Rotation of the pinion member 120 causes the pin members 130 between the pinion member 120 and inverted apex member 41 to be less inclined, forcing the inverted apex portion 41 against the nose 12 of probe 10 and firmly fixing the probe member 10 and the drogue assembly 20 in a substantially fixed axial relationship. The rounded or spherical ended links 130 provide large contact surface area throughout this camming operation. This keeps bearing loads within allowable limits up to the on-center locked position.

The probe members 10 and drogue assemblies 20 are then in a locked position firmly holding the vehicle 2 to the spacecraft 1. This is the position assumed for launch or reentry.

To release the vehicle 2 from the spacecraft 1 the actuator arm 90 is moved in the opposite direction, causing the pinion member 120 and cam member 100 to rotate and relieving force against the nose 12 of the probe member 10. When the retraction of the inverted apex portion 41 is complete, pinion member 120 reaches the end of its travel as limited by stop 124 in slot 123. At this point in the rotation of pinion member 120, gear tooth 122 disengages from pinion member 120, gear teeth 121 and actuator arm 90 is free to continue driving cam member 100. As the cam member 100 continues to rotate in the opposite direction, the ball followers 83 first pass through the transition areas 106 of the cam slots 103 and then finally engage the outer circumferential portions 104 of the cam member slots 106. As the cam followers 83 engage this portion of the cam slots 103, the latch members 70 are forced to a retracted position, completely releasing the probe member 10 and thus the vehicle 2 from the spacecraft 1. When this occurs, all internal loads have been relieved and no reaction is imparted to vehicle 2 due to the release action.

Thus, the apparatus of the present invention provides a means for releasably connecting first and second space objects in a predetermined space relationship by connecting probe members attached to one of the space objects to drogue assemblies attached to the other space object in substantially fixed axial relationship. The unique design permits limited angular misalignment in pitch, yaw and roll. It also absorbs substantial docking energy from axial, radial and angular velocities at impact. Its operation is relatively simple and easy whether space vehicles are being docked or undocked.

While a single embodiment of the invention has been described herein, many variations thereof can be made without departing from the spirit of the invention. Therefore, it is intended that the scope of the invention be limited only by the claims which follow.

I claim:

1. Apparatus for releasably connecting first and second objects in predetermined space relationship including at least one probe member mounted on said first object having an elongated shank portion at the distal end of which is provided a target nose portion, said tapered nose and shank portion being connected by an annular shoulder facing toward the proximal end of said shank portion, and at least one drogue assembly mounted on said second object for releasably capturing said probe member upon said first and second objects being brought into close proximity with each other, said drogue assembly comprising:
   housing means attached to said second object;
   cone means, having inwardly tapered conical surfaces, carried by said housing means which receives said probe member upon said bringing of said first and second objects into said close proximity;
   latch means carried by said housing means including a plurality of latch members radially movable, relative to a central axis of said drogue assembly, between retracted positions, in which said latch members do not project inwardly of said tapered conical surfaces, and extended positions, in which said latch members project inwardly of said tapered conical surfaces which engages with said probe member; and
   operator menas carried by said housing means and operable, when said probe means has been fully received by said cone means, which locks said latch members in said extended positions engaging said annular shoulder of said probe member and releasably connecting said probe member and said drogue assembly in a substantially fixed axial relationship.

2. Apparatus as set forth in claim 1 in which said operator means comprises a cam member which engages with said latch members and mounted on said housing means for rotation about said axis between first and second terminal positions which moves said latch members between said retracted and extended positions in response to rotation of said cam member and an actuator member mounted on said housing means and connected to said cam member for rotation thereof.

3. Apparatus as set forth in claim 2 in which said cam member is rotatable to a position intermediate of said first and second terminal positions in which said latches are free to move between said extended and retracted positions in response to engagement by said tapered nose portion of said probe member upon axial engagement of said cone means by said probe member.

4. Apparatus as set forth in claim 3 in which said latch means comprises biasing means biasing said latch members toward said extended positions.

5. Apparatus as set forth in claim 3 in which said cam member comprises a plurality of cam slots each of which comprises an outer circumferential portion and an inner circumferential portion connected by an intermediate transition portion, each of said slots being engaged by cam follower portions of one of said latch members, rotation of said cam member causing said camfollowers to move between said outer and inner circumferential portions of said cam slots for effecting said movement of said latch members between said retracted and extended positions.

6. Apparatus as set forth in claim 5 in which said latch members are attached to said housing means by pivot connections about which said latch members pivot for said radial movement between said retracted and extended positions in response to said movement of said cam followers between said outer and inner circumferential portions of said cam slots.

7. Apparatus as set forth in claim 6 in which said latch means comprises biasing means biasing said latchmembers toward said extended positions when said cam follower portions are engaging said intermediate transition portions of said cam slots, upon engagement of said latch members by said tapered nose portion of said probe member, thereby permitting capture of said probe member by said drogue assembly.

8. Apparatus as set forth in claim 7 in which said cam member is rotatable, after said capture of said probe member, to said second terminal position locking said latch members in said extended positions engaging said annular shoulder of said probe member and holding said tapered nose portion of said probe member firmly against said cone means.

9. Apparatus as set forth in claim 1 in which said cone means comprises an inverted frusto-conical portion and an inverted apex portion, the inner surfaces of which provide said inwardly tapered conical surfaces, said inverted apex portion being mounted for limited axial movement relative to said inverted frusto-conical portion.

10. Apparatus as set forth in claim 9 in which said operator means comprises a pinion member mounted for rotation about a common axis with the axis of said inverted frusto-conical and apex portions of said cone means and effective upon rotation thereof by engagement with an actuator member mounted on said housing that moves said inverted apex portion of said cone means toward said inverted frusto-conical portion, rigidly confining said tapered nose portion of said probe member between said latch members and said inverted apex portion and releasably connecting said probe member and said drogue assembly in said substantially fixed axial relationship.

11. Apparatus as set forth in claim 10 including link members interspersed between said inverted apex portion and said pinion member for translating rotational movement of said pinion member to axial movement of said inverted apex member.

12. Apparatus as set forth in claim 11 in which said inverted apex portion and said pinion member are provided with recessed holes at radially disposed intervals, said link members being elongated cylindrical members the ends of which are spherically rounded, one end of each being disposed in one of said recessed holes in said pinion member and the opposite end of which is disposed in a corresponding one of said recessed holes in said inverted apex portion.

13. Apparatus as set forth in claim 2 in which the recessed holes of said pinion member and said inverted apex portion are angularly displaced relative to each other so that said link members are inclined relative to said central axis, rotation of said pinion member so as to bring said recessed holes toward angular alignment causing said pin members to be less inclined and forcing said inverted apex portion away from said pinion member and toward said inverted frusto-conical portion.

14. Apparatus as set forth in claim 13 including biasing means attached to said pinion member biasing said pinion member away from said angular alignment of said recessed holes.

15. Apparatus as set forth in claim 1 including spring means carried by said housing engaging said cone means which cushions said cone means upon engagement thereof by said probe means.

16. Apparatus as set foth in claim 15 in which said spring means comprises a plurality of spring loaded plungers radially disposed around said cone means and the axes of which are substantially perpendicular to said conical surfaces thereof.

17. Apparatus as set forth in claim 15 in which said spring means comprises a spirally wound spring the central axis of which coincides with the central axis of drogue assembly.

18. Apparatus as set forth in claim 1 including switch means carried by said housing means which engages said probe means upon said probe means being received by said cone means thereby initiating operation of said operator means.

19. Apparatus as set forth in claim 1 in which there are three of said probe members on said first object equally spaced from a first centerpoint and three of said drogue assemblies on said second object correspondingly equally spaced from a second centerpoint.

20. Apparatus as set forth in claim 19 including target means carried on said second object for coaxial alignment with said first and second centerpoints on proper registration of said probe members with said drogue assemblies.

* * * * *